(12) United States Patent
Bigolin et al.

(10) Patent No.: US 10,435,098 B2
(45) Date of Patent: Oct. 8, 2019

(54) MODULAR SUPPORT ELEMENT FOR THE HUMAN BODY

(71) Applicant: Selle Royal S.p.A., Pozzoleone (Vicenza) (IT)

(72) Inventors: Barbara Bigolin, Pozzoleone (IT); Claudio Checchin, Pozzoleone (IT); Marco Malfatti, Pozzoleone (IT)

(73) Assignee: SELLE ROYAL S.P.A., Pozzoleone (Vicenza) (IT)

( * ) Notice: Subject to any disclaimer, the term of this patent is extended or adjusted under 35 U.S.C. 154(b) by 91 days.

(21) Appl. No.: 15/520,679

(22) PCT Filed: Oct. 20, 2015

(86) PCT No.: PCT/IB2015/058076
§ 371 (c)(1),
(2) Date: Apr. 20, 2017

(87) PCT Pub. No.: WO2016/063218
PCT Pub. Date: Apr. 28, 2016

(65) Prior Publication Data
US 2017/0313373 A1 Nov. 2, 2017

(30) Foreign Application Priority Data

Oct. 20, 2014 (WO) .................. PCT/IB2014/065476
Apr. 22, 2015 (IT) ........................ 102015000012790

(51) Int. Cl.
*B62J 1/20* (2006.01)
*B62J 1/00* (2006.01)
(Continued)

(52) U.S. Cl.
CPC . *B62J 1/20* (2013.01); *B62J 1/00* (2013.01); *B62J 1/08* (2013.01); *B62J 1/18* (2013.01); *B62J 1/22* (2013.01); *B62J 1/28* (2013.01)

(58) Field of Classification Search
CPC ......... B62J 1/20; B62J 1/00; B62J 1/08; B62J 1/28; B62J 1/18; B62J 1/22; B62J 1/24; B62J 1/26
(Continued)

(56) References Cited

U.S. PATENT DOCUMENTS

| 6,443,524 B1 * | 9/2002 | Yu .............................. B62J 1/02 |
| | | 297/195.1 |
| 6,523,891 B1 * | 2/2003 | Yates ....................... B62J 1/002 |
| | | 297/195.1 |

(Continued)

FOREIGN PATENT DOCUMENTS

| EP | 2085302 | 5/2008 |
| EP | 2052955 | 4/2009 |

(Continued)

OTHER PUBLICATIONS

International Search Report for PCT/IB2015/058076 dated Dec. 9, 2015 (2 pages).

*Primary Examiner* — Syed A Islam
(74) *Attorney, Agent, or Firm* — Tutunjian & Bitetto, P.C.

(57) ABSTRACT

The present invention relates to a support element for the human body, including a padding component and a base component or body, the base component including an upper, in use, surface, as well as a lower, in use, surface, the padding component includes an upper, in use, surface, and a lower, in use, surface designed to engage the upper, in use, surface of the base component, the support element including removable anchoring means of the base component to the padding component.

16 Claims, 14 Drawing Sheets

(51) Int. Cl.
*B62J 1/18* (2006.01)
*B62J 1/22* (2006.01)
*B62J 1/08* (2006.01)
*B62J 1/28* (2006.01)

(58) Field of Classification Search
USPC .................................. 297/215, 195.1, 214
See application file for complete search history.

(56) References Cited

U.S. PATENT DOCUMENTS 7,735,916 B2 * 6/2010 Yu .............................. B62J 1/20
297/195.1
2007/0273184 A1 * 11/2007 Garneau .................... B62J 1/00
297/195.1

FOREIGN PATENT DOCUMENTS

WO 2007/021943 3/2007
WO 2007/034422 3/2007

* cited by examiner

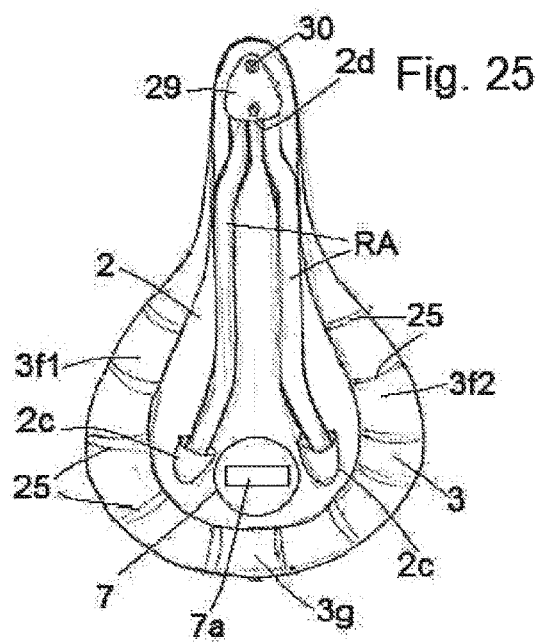
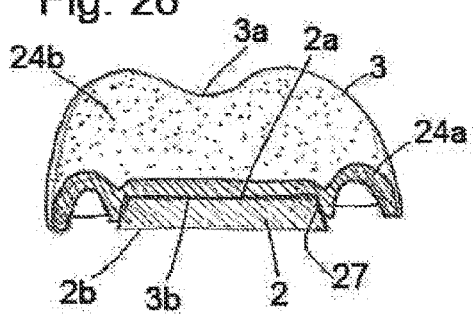
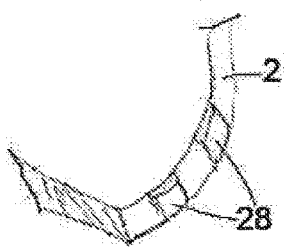

22  RA  2

RA

2

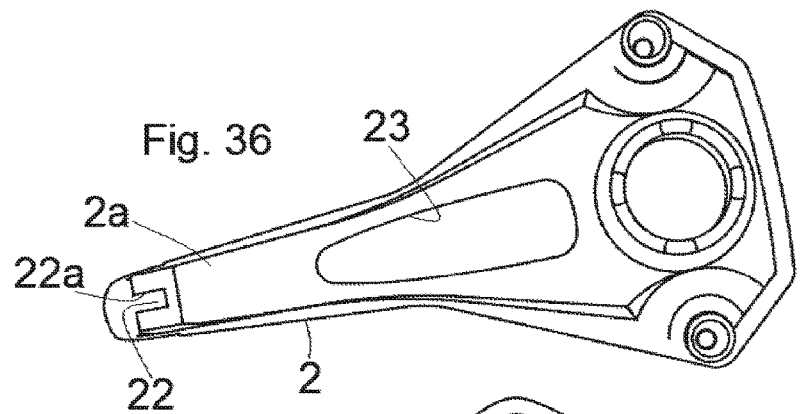
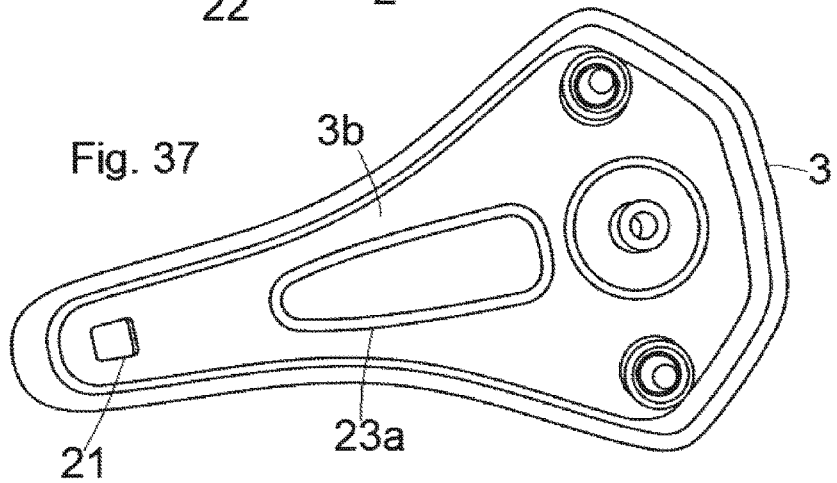
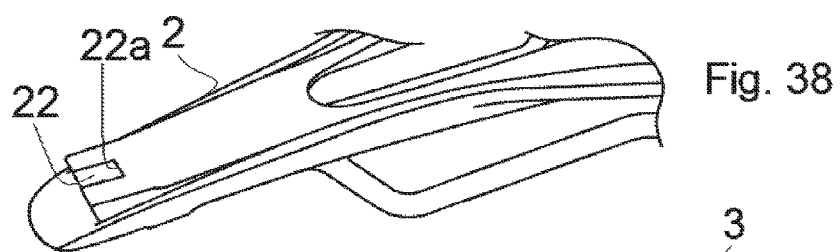
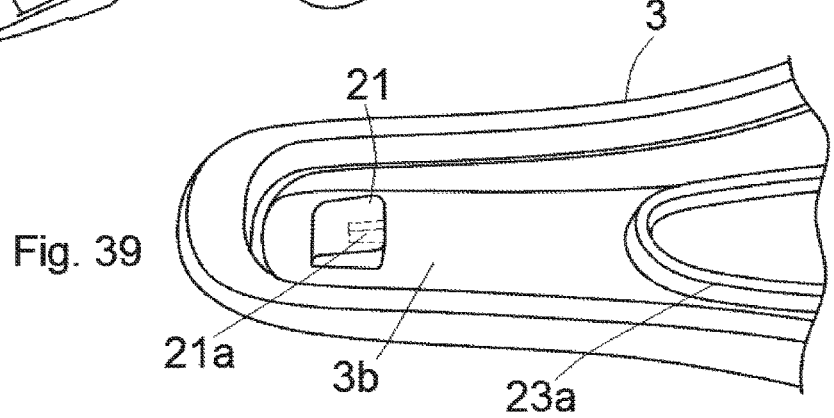

MODULAR SUPPORT ELEMENT FOR THE HUMAN BODY

TECHNICAL FIELD OF THE INVENTION

The present invention regards a modular support element for the human body, such as a saddle for a vehicle, for example a bicycle, motorcycle or another vehicle.

STATE OF THE PRIOR ART

Up to now, many saddles have been proposed for bicycles, if desired also equipped with a so-called ICS (Integrated clip system) component, i.e. a component that delimits a groove or the like for the engagement and anchorage to the saddle of an accessory, such as a bag.

Saddles have also been proposed that are equipped with a body, usually directly fixable or constrainable to the frame of a bicycle, and a padding fixed to the body and made of a softer material than the body.

Nevertheless, the saddles proposed up to now are not as easy to assemble and the respective assembly procedures are quite difficult.

In addition, the existing saddles, once built and assembled, constitute a single piece, whose components are hard to replace or change by the final user, if it is desired to modify the characteristics or size thereof or simply replace the components with new ones.

SUMMARY OF THE INVENTION

The technical task of the present invention is to improve the state of the art, by implementing a modular support element for the human body, such as a saddle lacking the above-lamented drawbacks.

In the scope of such technical task, one object of the present invention is to arrange a modular support element for the human body which is easily and quickly assemblable and interchangeable.

Another object of the present invention is to provide a modular support element for the human body that is easily assemblable in a reliable manner.

A further object of the present invention is to provide a modular support element for the human body in which it is possible to prevent, or in any case limit, the damage deriving from vandalistic acts and thefts.

Another object of the present invention is to provide a modular support element for the human body wherein it is possible to easily replace worn or damaged parts, thus being less expensive and more ecological, or wherein it is possible to replace a component as desired in accordance with the needs and tastes of the user.

In accordance with one aspect of the invention, a modular support element is provided according to the present specification.

The present specification refers to preferred and advantageous embodiments of the invention.

BRIEF DESCRIPTION OF THE DRAWINGS

Other characteristics and advantages of the invention will be clearer from the description of embodiments of a support element, illustrated by way of example in the enclosed drawings in which:

FIG. 25 is a bottom view of one version of a support element according to the present invention;

FIG. 26 is a cross section view of the support element of FIG. 25; and

FIG. 27 is a view of a detail of a component of the support element of FIG. 25;

FIGS. 36 and 37 are bottom views of a base component and a padding component of a support element according to the present invention in accordance with another embodiment; and FIGS. 38 and 39 show details in an enlarged scale of FIGS. 36 and 37.

In the set of drawings, equivalent parts or components are marked with the same reference numbers.

DETAILED DESCRIPTION OF THE INVENTION

Figure 1:
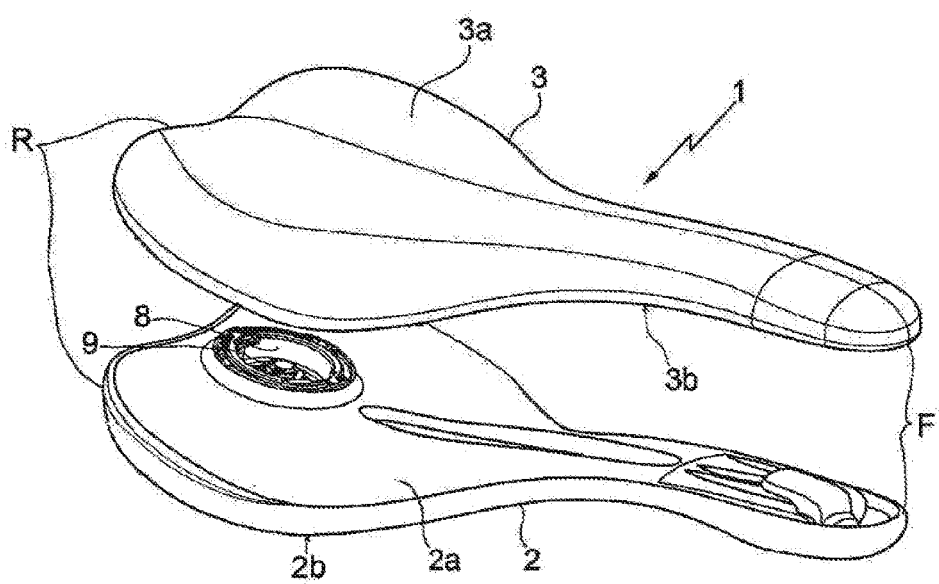
FIG. 1 is a slightly top and exploded perspective view of the components of a saddle according to the present invention.

With reference to the figures, a support element 1 for the human body is illustrated, such as a saddle for a vehicle, for example a bicycle or a motorcycle, or sports equipment in general or sports equipment such as a cyclette or the like.

The support element 1 comprises a base component or body 2, for example constrainable to the frame of a vehicle such as a bicycle or a motorcycle, and at least one padding component 3.

If the support element 1 is a saddle for bicycles, as is known, a so-called fork component could be interposed between the base component 2 and the frame; such fork 15 usually comprises a U-shaped component formed by a pair of bars or tines connected at one end.

Alternatively, and as better described hereinbelow, the base component 2 could be a rigid body lacking fork of connection to the seat post, capable of being directly connected to the seat post, or a body with integrated post, or with an annular fork for example commercially termed "moebius".

The base component 2 can then be equipped with attachment means for a fork or rail component RA (see for example FIGS. 6 and 25), preferably at its lower surface 2b, for example two blocks in relief 2c, at the rear R of the base component 2 delimiting respective openings for a section of the fork RA, and a seat 2d on the front F of the base component 2 for the insertion of the tip or tips of the fork RA.

The base component 2 is, in general, when the support element 1 is a bicycle saddle, the connection element between the post mounted on the bicycle and the padding component 3.

The base component 2 has a substantially triangular configuration, with a front portion, 30 placed at the front F of the support element 1, lengthened or tapered, and a rear portion, placed at the rear R of the support element 1, enlarged.

The size of the base component 2 is the minimum size capable of ensuring the support of the support element 1; indeed, the size of the base component substantially corresponds, when the fork RA is present, to the distance between the front attachment 5 area of the fork and the area or the two areas of rear support for the fork itself, i.e. from the start area of the fork to the base of its spokes.

In such a manner, as will be better understood hereinbelow, the support component 2 is capable of supporting any type or shape or size of padding component 3, possibly due to the further support supplied by the surface, lower or outer during use 3b, or when o present, by the base made of rigid material or first rigid support layer 24a of the padding component 3.

The rigid material base or first rigid support layer 24a of the padding component 3 is obtained, in one version of the invention, with the same materials as the base component 2 or it is substantially rigid like the base component 2.

In such a manner, as will be better understood hereinbelow, the surface, upper or inner during use 2a, of the base component 2 has a support area that is limited or less than the surface, lower or outer during use 3b, or when present, than the base made of rigid material or first rigid support layer 24a of the padding component 3.

The surface, lower or outer during use 3b, or when present, the base made of rigid material or first rigid support layer 24a of the padding component 3 is therefore at least partially overhanging with respect to the base component 2.

In such version, the rigid material base or first rigid support layer 24a, at least for the areas overhanging or projecting with respect to the base component 2, is possibly self-supporting or self-bearing, in the sense that it supports the weight of the user even in the areas not above the base component 2.

In one version of the invention, the presence of an overhanging padding component 3 facilitates the pedaling movement, when for example the user is a cyclist and the support element 1 is a saddle, due to the fact that, being overhanging and not in direct contact with the base component 2, such edges are more pliable or in any case easily o deformable with respect to the central part of the support element 1.

The fact that such edges are pliable or deformable does not however preclude the cyclist or user from being assured the required support, even if differentiated from zone to zone, conferred by the entire surface or area of the support element 1.

The overhanging area that is created between the base component 2 and the outer 5 perimeter edges of the padding component 3 constitutes a zone with differentiated rigidity, with respect to the superimposed area of base component 2 and padding component 3. In such a manner, such overhanging zone is more comfortable for the user.

The base component 2 comprises a surface, upper or inner during use 2a, as well as a surface, lower or outer during use 2b, while the padding component 3 comprises a surface, upper or outer during use 3a and a surface, lower or inner during use 3b intended to engage the surface, upper during use 2a, of the base component or body 2, for example by overlapping or coming into contact with the surface itself.

The surfaces 2a and 2b of the base component 2 and the surfaces 3a and 3b of the 15 padding component 3 have substantially matching and/or complementary shape.

Preferably, the upper surface 2a of the base component 2 is substantially configured like the lower surface 3b of the padding component 3, such that the same, once the support element 1 is assembled, can be engaged or abutted against each other for the entire extension thereof, or at least substantially for the entire extension of the upper surface 20 2a of the base component 2.

In one version of the invention the surface 2a, upper or inner during use, of the base component 2 is in contact with the surface, lower or inner 3b during use, of the padding component 3.

If the support element 1 is a saddle, then the upper surface 3a of the padding 3 is, preferably, substantially free and intended to constitute the sitting surface for a user. For such purpose, the padding component 3 can also be entirely or partly covered by a cover for example made of leather or of another natural or synthetic material.

Preferably, the padding component 3 is made of soft material, in particular softer than the base component 2. For example the padding can be made of a material such as a polyurethane foam, an elastomeric material or the like.

In addition, one or more inserts can be introduced in the padding component 3, such inserts having softness, elasticity and/or color and/or physical or viscoelastic properties different from the padding component 3.

The padding component 3 or the at least one part or padding component 3 can also have at least one first rigid support layer or a base made of rigid material 24a, for example made of plastic.

In addition, in one version of the invention, the padding component 3 can comprise a plurality of separate parts or portions, having softness or elasticity or color or physical or viscoelastic properties or size or shape that are different. In such case, such separate parts or portions, once assembled, constitute the complete extension of the padding component 3. Analogously, in one version of the invention, a plurality of padding components could be present, which, once assembled, form the complete extension of the padding component 3.

In such a manner, the final user has more possibilities to adjust the characteristics of the support element 1 to his/her actual needs or tastes, or to only replace those components or parts of the support element 1 that are damaged or worn.

Naturally, if a plurality of parts or portions of a padding component 3 or a plurality of padding components 3 are present, these can have all or part of the characteristics described for the single padding component 3 of the support element 1.

For example, if a central portion or part and at least one side portion or part of the padding element 3 are present, such parts or portions have at least one surface, lower during use 3b, adapted to be at least partially engaged with the surface, upper during use 2b, of the at least one base component 2, and to be constrained to the same by means of removable anchoring means of type equivalent to or different from that described in detail in the following present description.

In a still further version of the present invention, a first rigid support layer 24a can be present, adapted to be engaged with the surface, upper during use 2a, of the base component 2, on which one or more inserts or portions of at least one padding component 3 are constrainable.

When reference is made, in the course of the present description, to a padding component 3 or to at least one padding component 3, references may also be intended to one or more or each part or portion of the padding component 3.

On the at least one first rigid support layer or on the at least one rigid material base 24a, a foam or a softer material 24b is applied, the latter constituting the shock-absorbing and/or comfort element of the padding component 3.

The material of the first rigid support layer or of the rigid material base 24a is more rigid and supporting of the material with which the second layer 24b is obtained.

The first rigid support layer or the rigid material base 24a of the padding component 3 corresponds to the surface, lower or inner during use 3b, of the latter.

The support element 1 then comprises removable anchoring means for removably anchoring the base component 2 to the padding component 3, such that it is possible to easily and quickly assemble or disassemble the base component 2 and the padding component 3.

Preferably, the support element 1 according to the present invention comprises means 4a, 4b, 4e for engaging an accessory, such as a handle 5 (see in particular FIG. 7) or protection components 50 and/or the like.

The engagement means 4a, 4b, 4e are intended to act or operate between the base component or body 2 and the padding component 3 or better yet in the area between the upper surface 2a of the base component 2 and the lower surface 3b of the padding component 3.

Figure 2:
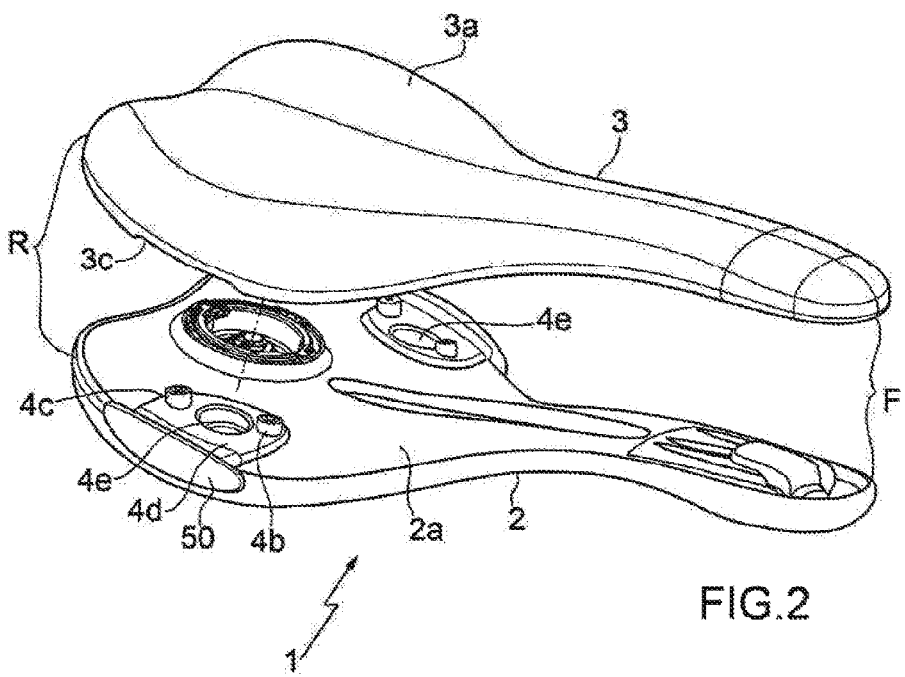
FIG. 2 is a view of a saddle similar to that of FIG. 1 but lacking an accessory.

The accessory can as stated above comprise a handle, a protection component, a taillight, a bag, a water-bottle carrier or another element that may be useful for the user. The engagement means can for example comprise one or more first engagement holes or openings 4a, through or not, formed in the base component 2 (visible in FIG. 3) and, in addition, one or more screw or bolt or fitting elements 4b (visible in FIG. 2) each engageable in a respective first engagement hole or opening 4a. In such a manner, the engagement means fix the accessory 5 or 50 to the base component 2. The fixing of the accessories can also be obtained by means of self-threading screws engageable in the first engagement hole or opening 4a.

In addition, a housing seat 6 can be provided in the padding component 3, for the head 4c of the screw or bolt 4b inserted in a first engagement opening 4a provided in the base component 2; the main unscrewing body (not visible in the figures) of the screw or bolt 4b is instead removably insertable, for example via screwing, in the respective hole or opening 4a.

The accessory 5, 50, when present, includes a first end or a portion engageable by means of the engagement means 4a, 4b to the base component 2 and another or second end or portion which extends outside, or in any case distal from the area between the upper surface 2a of the base component 2 and the lower surface 3b of the padding component 3.

In one version of the invention, a plate 4d can be fixed to the first end or portion of the accessory 5, 50 (e.g. it can be glued or welded or obtained in a single piece with the accessory 5, 50); in such plate 4d, one or more second engagement openings 4f (see in particular FIG. 7) are provided which can each be aligned with a respective engagement hole or opening 4a present in the base component 2. After having aligned the one or more second engagement openings 4f, a bolt or screw 4b is inserted in the openings (4a as well as 4f) thus aligned, thus fixing each plate 4d, and hence the accessory 5 or 50, to the base component 2.

With reference to the specific non-limiting embodiment illustrated in the figures, the support element comprises two protection components 50, one placed on one side of the support element 1, the other placed on the opposite side of the support element 1.

Figure 7:
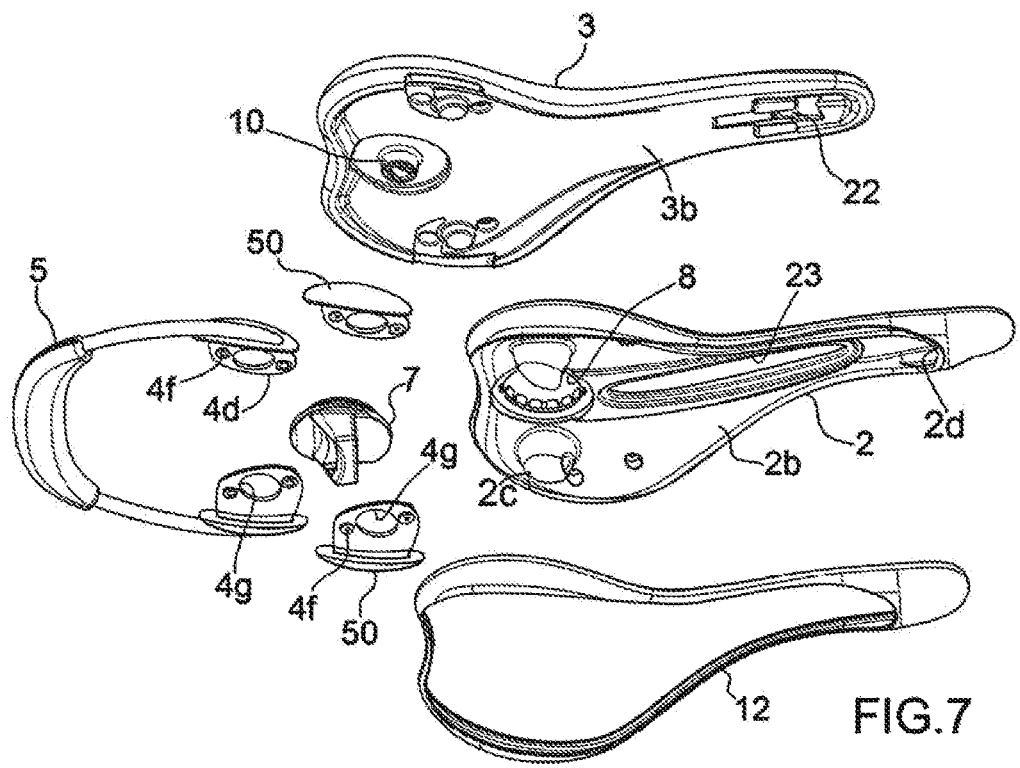
FIGS. 7 and 8 are slightly bottom and exploded perspective views of respective variants of a support element according to the present invention.

With reference then to FIG. 7, a support element 1 is illustrated equipped with multiple accessories, for example a handle 5 and protection components 50 fixed as indicated above. Naturally, the above-indicated accessories may not be present, or they can be of a different type, as previously indicated, without departing from the protective scope of the present invention.

For a correct and quick positioning of the or of each plate 4d on the base component 2, a slot or groove can be provided in the base component 2, in which a relief portion 4e of the plate 4d is insertable, for example fit insertable. Alternatively, the plate 4d can comprise an opening 4g (see in particular FIG. 7) alignable with a corresponding portion of the base component 2 or padding component 3.

Figure 3:
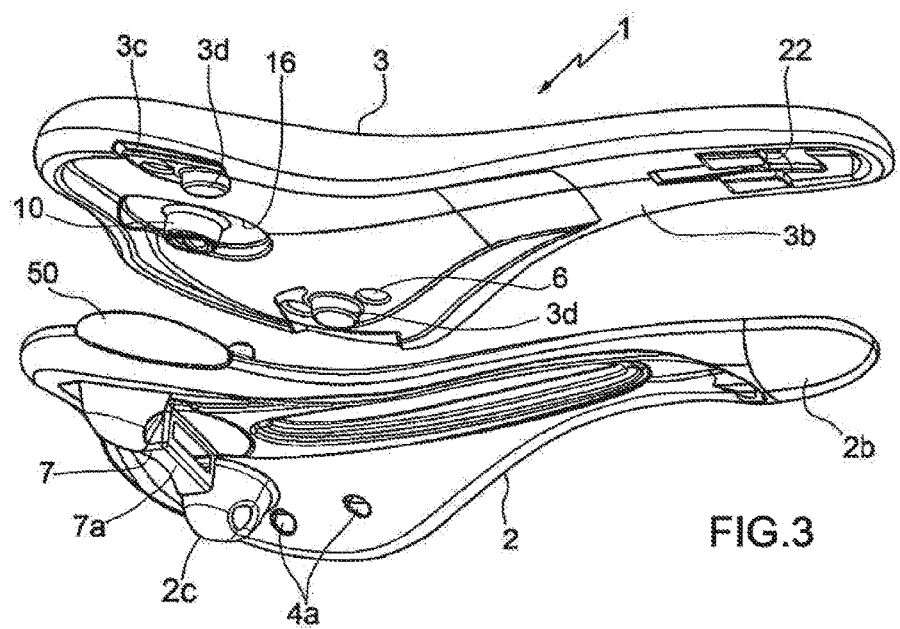
FIG. 3 is a slightly bottom and exploded perspective view of the components of the saddle of FIG. 2.
Figure 4:
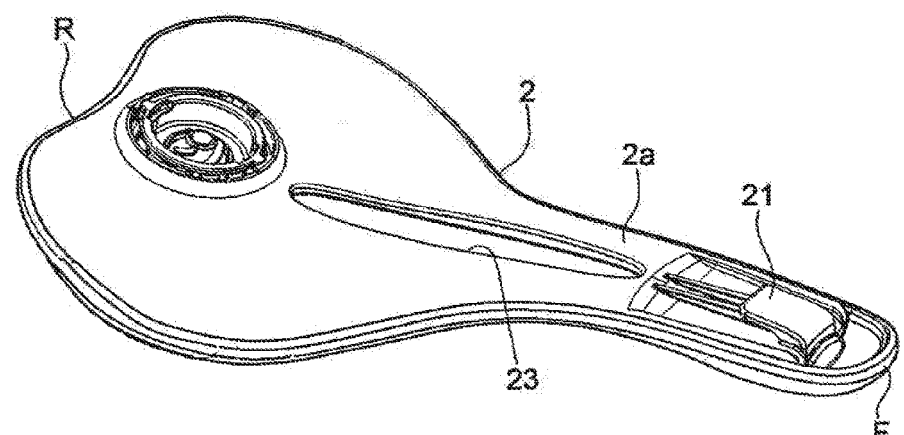
FIG. 4 is a slightly top perspective view of a base component or body of the saddle of FIG. 1.

In the padding component 3, as is visible in FIG. 3, one or more lowered areas 3c can instead be delimited for the shape coupling and for the reception of a respective plate 4d, when the base component 2 and the padding component 3 are assembled. If then the at least one plate 4d comprises a relief portion 4e or a recessed portion is provided as indicated above, block components 3d can be provided which project starting from the padding component 3, which are intended to be shape-inserted and shape-engaged with a respective recessed or lowered portion 4e of a plate 4d or recessed portions of the base component 2 or of the padding component 3, when the latter are assembled.

In addition, the block components 3d, if provided, carry out the function of centering the padding component 3 on the base component 2 and can confer further stability to the assembly of the support element, preventing mutual longitudinal translations of the two components 2 and 3.

Naturally, as will be understood, as also stated above, the first engagement openings 4a can be formed in the padding component 3 for constraining the accessory 5 or 50 thereto.

In such case, the areas and the elements described above will be situated on the opposite component with respect to that described above.

As will be understood, one accessory could be constrained to the base component 2 or to the padding component 3 with engagement means acting between them, or better yet between the respective upper 2a and lower 3b surfaces; otherwise, for example, one end of an accessory (possibly shaped in a manner such to be shape-engaged with respective parts of the base component 2 and/or of the padding component 3) could be arranged between the base component 2 and the padding component 3 and, then, by shutting such components 2, 3 together, the accessory 5, 50 can be locked in position. Once the saddle without accessories is assembled, slits do not in any case remain visible (at the points where the accessories themselves would have been anchored or positioned), which would clearly give rise to an anti-aesthetic effect.

Figure 8:
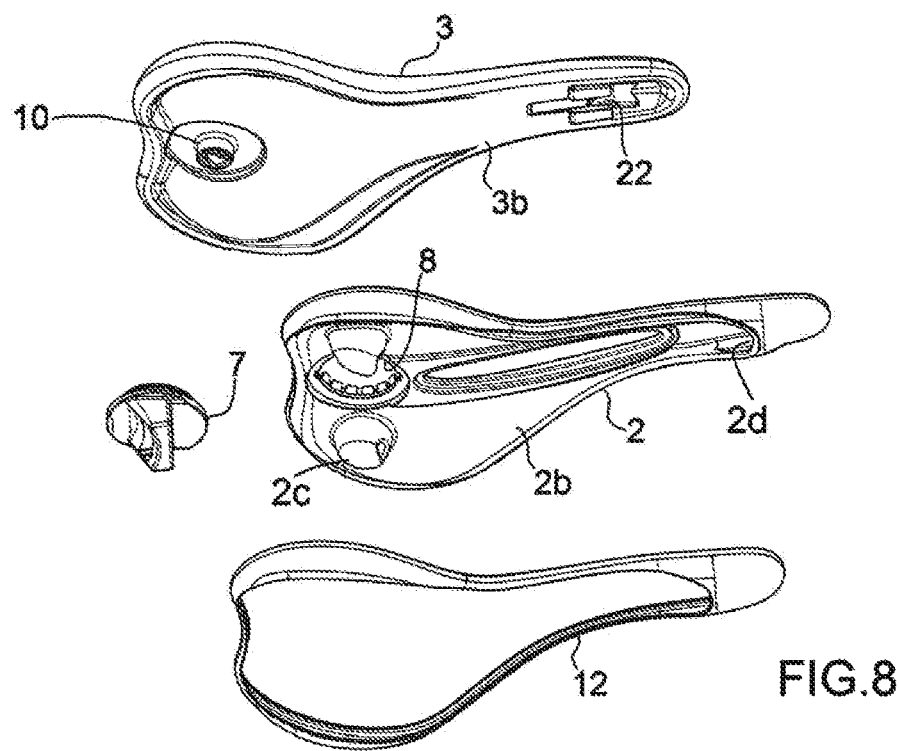
Figure 9:
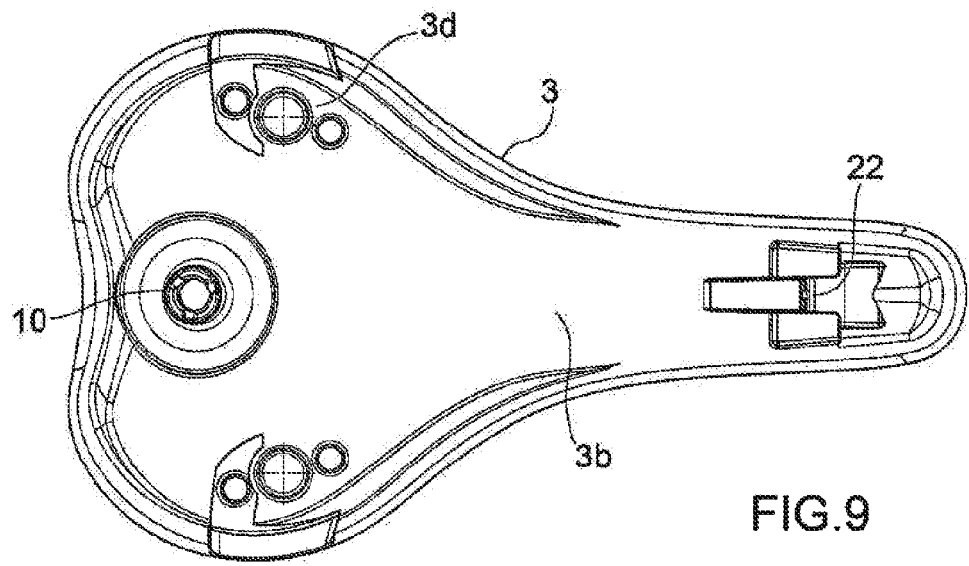
FIGS. 9 and 10 are respectively plan and slightly bottom perspective views of a padding component according to the present invention.
Figure 10:
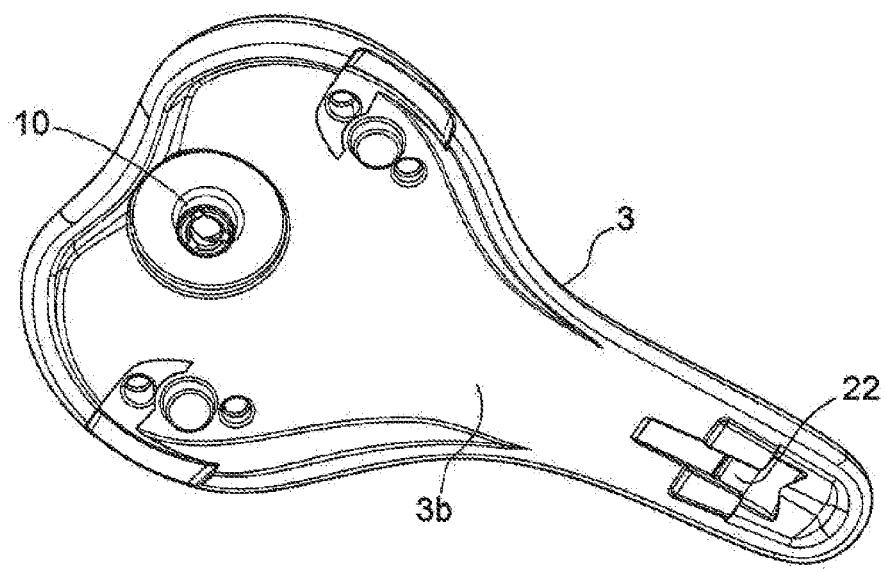
Figure 11:
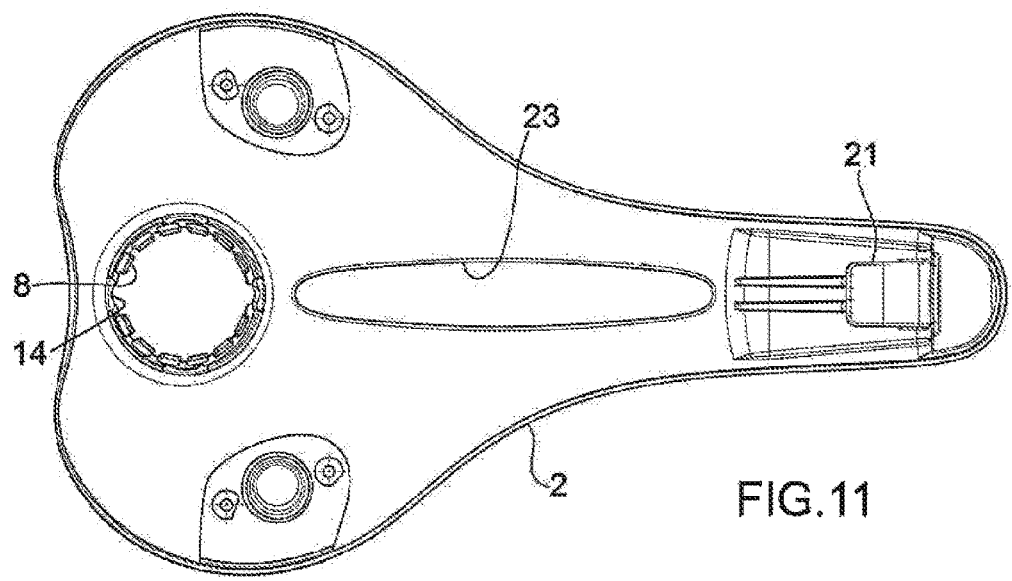
FIGS. 11 and 12 are respectively plan and slightly top perspective views of a base component of a support element according to the present invention.
Figure 12:
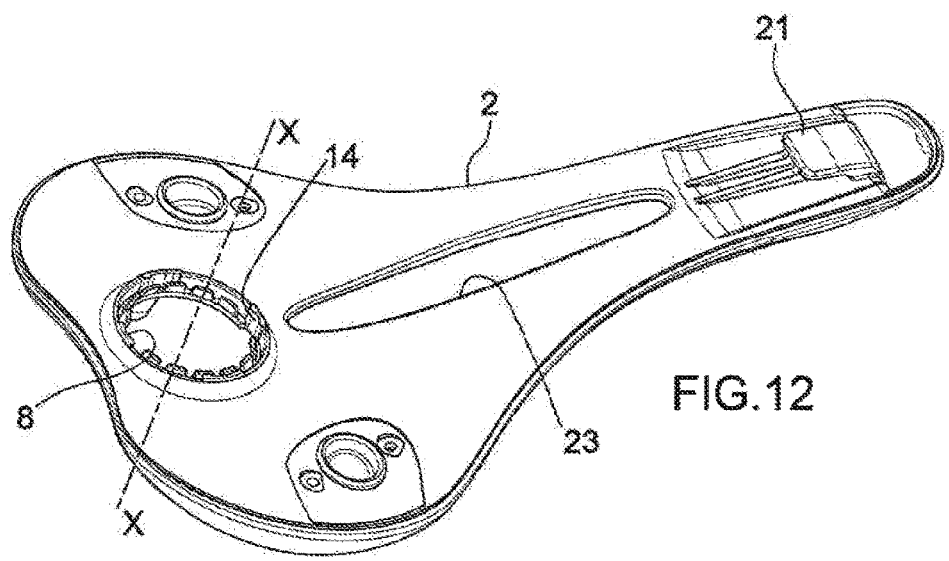
Figure 13:
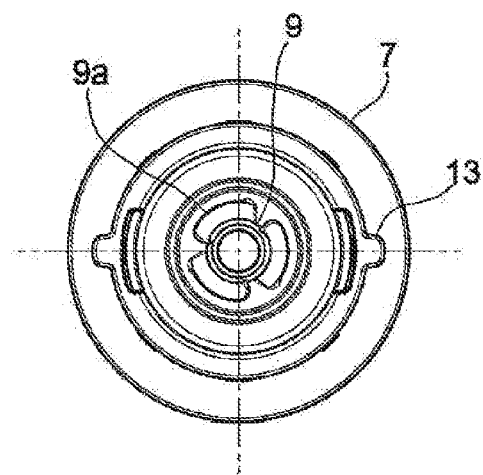
FIGS. 13 to 16 are respectively plan, perspective, side and front views of a mobile or key component of a support element according to the present invention.
Figure 14:
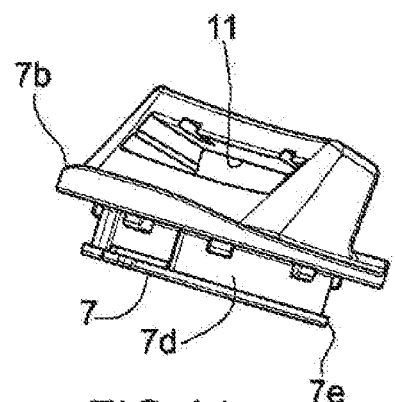
Figure 15:
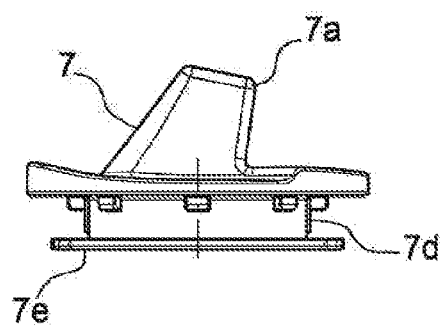
Figure 16:
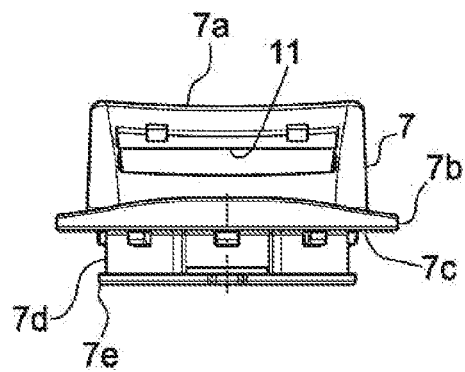
Figure 17:
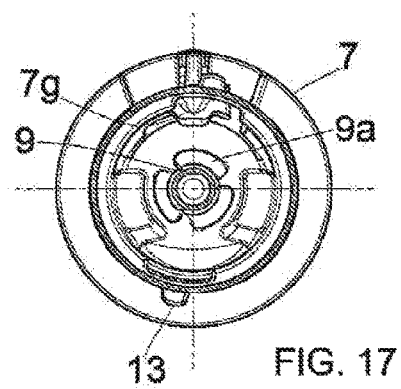
FIG. 17 is a bottom view of a detail of another embodiment of a support element according to the present invention.
Figure 18:
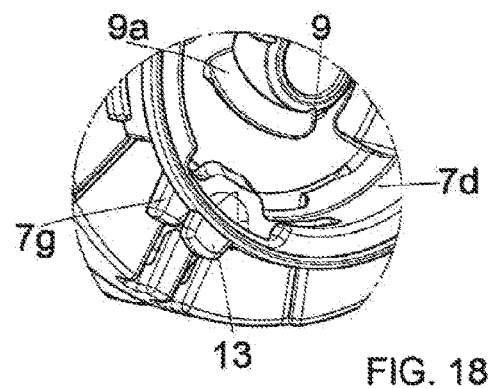
FIG. 18 is a detail of FIG. 17.
Figure 19:
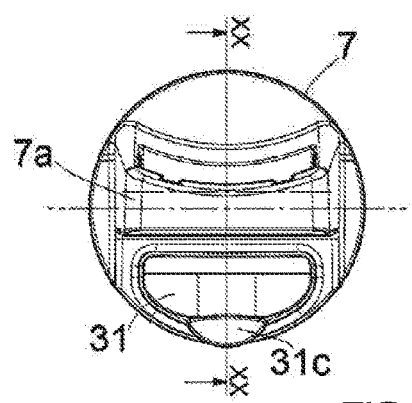
FIG. 19 is a top view of the detail of FIG. 17.
Figure 20:
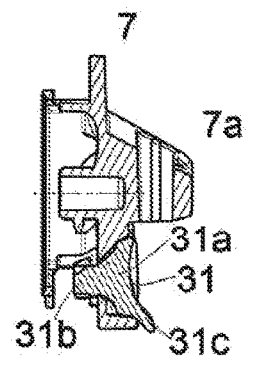
FIG. 20 is a section view along the line XX-XX of FIG. 19.
Figure 21:
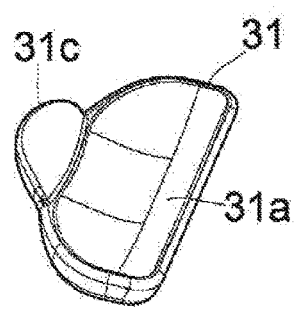
FIGS. 21 and 22 are respectively top and bottom perspective views of a locking/unlocking means of FIG. 17.
Figure 23:
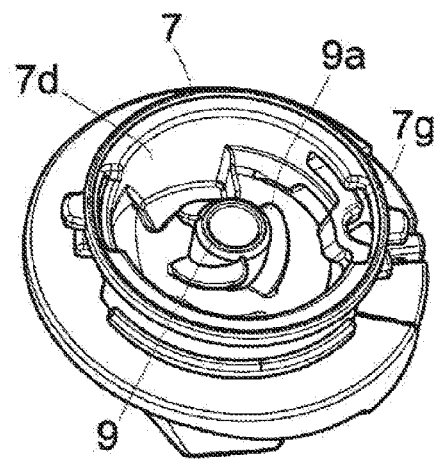
FIGS. 23 and 24 are respectively top and bottom perspective views of the key component of FIG. 17.
Figure 22:
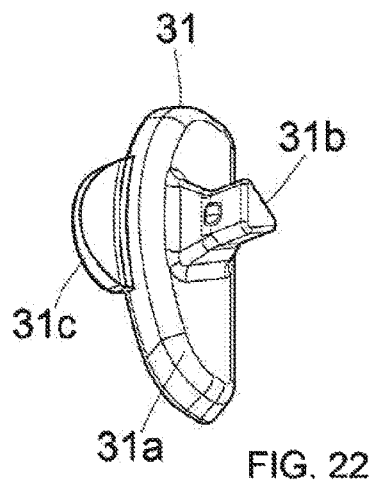
Figure 24:
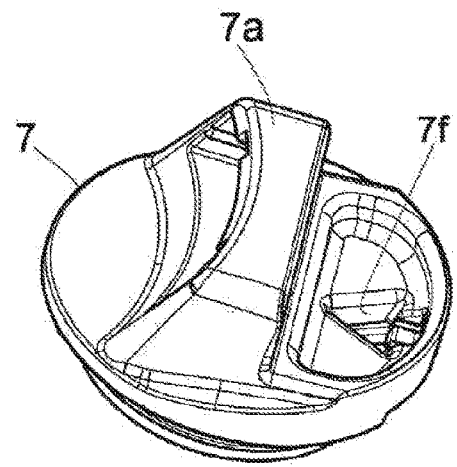

In addition, the support element could also lack accessories and engagement means for the same, as illustrated in FIGS. 1 and 8.

The support element (see in particular FIGS. 7 and 8) can also comprise a covering or frame component 12, for example made of rigid plastic or similar materials, intended to enclose and cover, during use, the fork and part of the base component 2.

Figure 5:
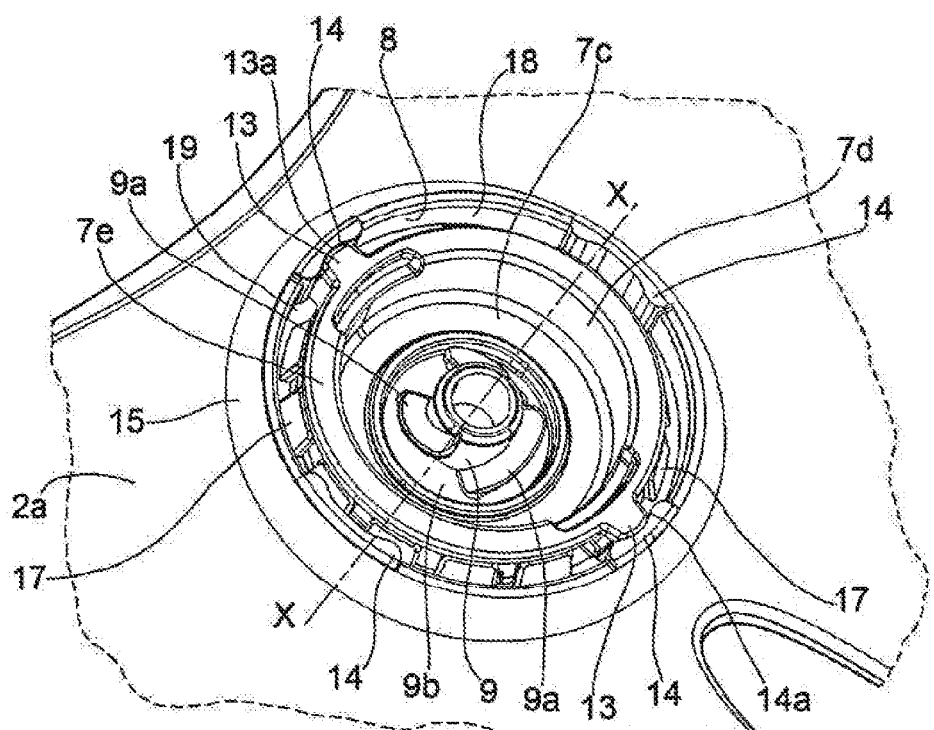
FIG. 5 is a detail in enlarged scale of FIG. 4.
Figure 6:
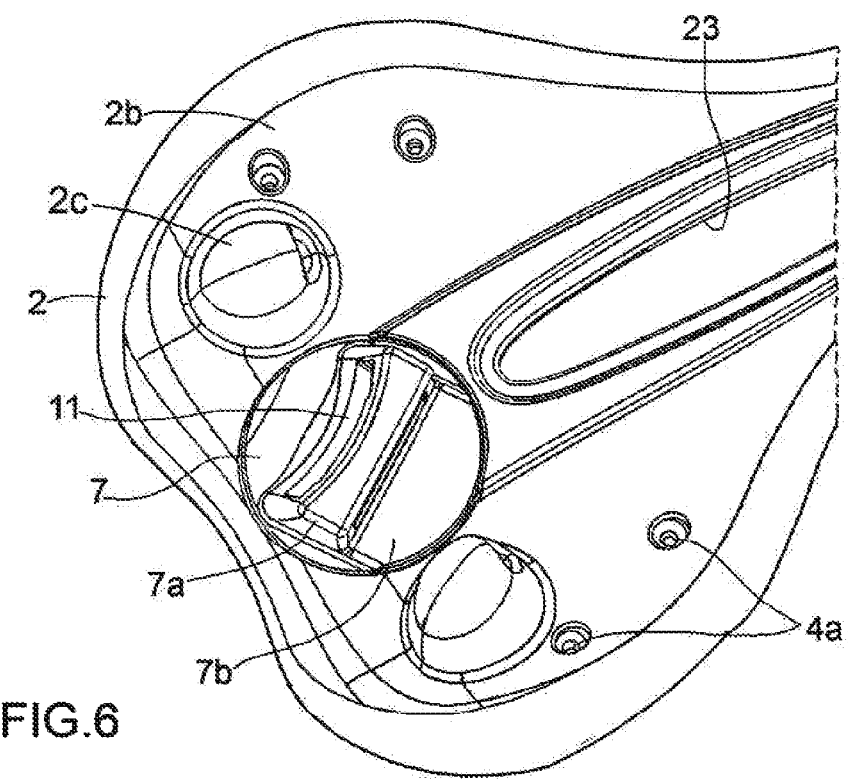
FIG. 6 is a slightly bottom perspective view of a detail of the base component or body of FIG. 4.

Then, with regard to the means for removable anchoring the base component 2 to the padding component 3, for example illustrated in FIGS. 5 and 6, these preferably include a gripping or grasping portion 7a extending outside the base component 2.

Such gripping or grasping portion 7a is engageable from outside the area between the base component 2 and the padding component 3.

The gripping or grasping portion 7a is, for example, placed at the lower surface 2b of the base component 2, so as to allow a manual displacement of the anchoring means. The gripping or grasping portion 7a is movable between at least one rest position (see for example FIG. 6), in which the base component 2 and the padding component 3 are released or releasable, and at least one work position (see for example FIG. 3), in which the base component 2 and the padding component 3 are firmly anchored to each other. Due to the presence of the gripping or grasping portion 7a, an operator or a user can therefore drive the removable anchoring means without requiring tools, such as screwdrivers or the like.

In addition, the removable anchoring means, as will be better described hereinbelow, can comprise one or more quick attachment structures or ICS.

Preferably, the removable anchoring means comprise:
a mobile or key component 7 mountable, for example rotatably, in an anchoring opening 8, for example around an axis x-x of symmetry of the opening 8, such opening being obtained in the base component 2 or in the padding component 3; the key component 7 can also have first constraining means 9 which project upward into the area between base component 2 and padding component 3, and
second constraining means 10 in the other component, padding 3 or base 2, intended to be engaged with the first constraining means 9 when the key component 7 is inserted in the respective anchoring opening 8 and the base component 2 is engaged with the padding component 3.

For such purpose, the removable anchoring means can comprise bayonet anchoring means.

As will be understood, the key component 7 could also be insertable along a longitudinal axis x-x of the opening 8, and thus not be rotatable around the axis x-x. In such case, the key component 7 could have control means, for example grippers or the like, intended to control the displacement of corresponding first constraining means which project into a portion insertable in the anchoring opening 8 formed in the base 5 component 2 or padding component 3 and intended to be engaged with corresponding second constraining means, in the other component, padding 3 or base 2.

The first constraining means can, for example, comprise a tang or bushing 9 from which a plurality of tabs 9a project that are circumferentially spaced from each other and have helical shape from one edge of the tang 9 to the other. The second constraining means i o can include a sleeve element 10 from which respective teeth or protuberances project or grooves are formed intended to be engaged, if desired as a bayonet, with the tabs 9a. The tabs 9a and the teeth or protuberances are preferably elastically pliable.

Preferably, both the tang 9 and the sleeve 10 comprise a tubular element with longitudinal axis corresponding to the axis x-x, when the support element is assembled.

The key component 7 can also comprise a quick attachment structure or ICS. For such purpose, the key component 7 can include a main plate 7b, if desired substantially flat, starting from a surface, internal during use, thereof (of the main plate 7b), the first constraining means 9 project, while from the other surface thereof, external during use, the gripping portion 7a is extended, which can comprise a bridge element delimiting an opening, preferably through 11, which can carry out the function of the female part of an ICS.

The main plate 7b of the key component 7 is anchorable in position, for example by means of connection means 13, 14 in the anchoring opening 8 of the base component 2 or padding component 3.

The connection means 13, 14 are for example snap connection means.

The connection means can comprise one or more (two in the drawings) projections 13 extended starting from an outer wall or edge of the key component 7 intended to engage respective recessed or cradle sections 14 (four in the drawings) delimited at the opening 8.

More particularly, for example, four recessed sections 14 can be provided, angularly spaced from each other by, for example, 90°; two projections 13 can also be provided, angularly spaced for example by 180°, and intended to be engaged with respective recessed sections 14, such that the key component can be fixed to the base component 2 or padding component 3 in multiple operative positions, e.g. a work position and a rest position.

The main plate 7b of the mobile component 7 can for example be configured as a solid of rotation around an axis of symmetry, which in assembly position is substantially coinciding with the axis x-x; in such case, the main plate 7b can also have from one side, more external during use, to the other side, more internal during use, a base wall 7c, for example annular, and delimiting a hole or an opening for inserting a block 9b from which the first constraining means 9 are extended, then a substantially cylindrical wall 7d extended starting from an outer edge of the base wall 7c and terminating with a flanged section 7e starting from an outer edge thereof the projections 13 being extended. As stated above, the base wall 7c can delimit a hole or opening that is internally threaded for the engagement with one externally threaded portion of the block 9b. Naturally, the block 9b could be integral with the main body 7b or it could be anchored in the main body 7b in another manner, for example by means of snap coupling means or by means of fit insertion, etc.

The gripping portion 7a, if present, can be extended starting from a surface, external during use, of the base wall 7c and in the direction opposite the cylindrical wall 7d.

In one version of the invention, starting from the upper surface 2a of the base component 2 or lower surface 3b of the padding component 3 in which the opening 8 is formed or delimited for positioning the key component 7, a tubular wall section 15 projects, preferably around the anchoring opening 8. Such tubular wall section 15, for example slightly frustoconical, is intended for the shape engagement with a recessed impression 16 made on the other component, padding 3 or base 2.

Still starting from the upper surface of the base component 2 or from the lower surface of the padding component 3, in which the opening 8 is formed or delimited for positioning the key component 7, a plurality of stop teeth 17 are extended towards the interior of the area between the base component 2 and the padding component 3. Such plurality of angularly-spaced stop teeth 17 are intended to engage the mobile component 7, allowing the same to rotate around the axis x-x, but obstructing the disengagement or disassembly thereof from the base component 2 or padding component 3.

More particularly, the anchoring opening 8 comprises, from an inner side to an outer side of the respective base component 2 or padding component 3, a substantially cylindrical section 18, if desired delimited by the tubular wall 15 and in which the recessed or cradle sections 14 can be obtained, then a transverse wall 19 starting from which the stop teeth 17 can be extended, which can be slightly tilted with respect to the axis x-x. For such purpose, the stop teeth have for example one end distant from the axis x-x which is constrained to the transverse wall 19 and a free end close or in proximity to the axis x-x. The free end of the stop teeth 17 is substantially at the level of or aligned with the recessed sections 14, in a plane transverse or orthogonal to the axis x-x. In addition, the recessed sections 14 can be delimited between two radially enlarged portions 14a relative to the respective substantially cylindrical section 18.

Preferably, at least one circumference section is provided around the axis x-x lacking stop teeth; such at least one section corresponds with the unscrewing sections of the recessed sections 14 intended to receive one or more respective projections 13, when the mobile component is in the work position in which the base component 2 and the padding component 3 are stably anchored.

The stop teeth 17 or better yet the respective free ends are aligned along a circumference with radius smaller than the diameter of the flanged section 7e and, if desired, than the distance between the projections 13 or between the free ends 13a thereof. Due to such configuration, when the mobile component 7 is assembled with the respective base component 2 or padding component 3, then the stop teeth 17 will allow the rotation of the mobile component 7, but not the exit thereof from the opening 8.

The opening 8, delimited by the base component 2 or by the padding component 3 and intended for housing or being engaged with the key component 7, can be delimited in a rear area of the support element 1 and, especially when the latter comprises a saddle, at the substantially enlarged rear area thereof.

The support element can also comprise at least one tongue 21 that is projected towards the front F or towards the rear R of the support element starting from the lower surface 3b of the padding component 3 or from the upper surface 2a of the base component 2, the tongue 21 being engageable with a seat 22 formed in the other surface, the upper surface 2a of the base component 2 or the lower surface 3b of the padding component 3, by relative sliding between the base component 2 and the padding component 3. If the support element comprises a saddle, the at least one tongue 21 and the at least one respective seat 22 are obtained at the tapered front part of the base component 2 and of the padding component 3.

In the base component 2, and at an intermediate portion thereof, a longitudinal through groove 23 can also be obtained.

If desired, the support element can be equipped with means for safely locking/unlocking the removable anchoring means in work position. Such safe locking/unlocking means could for example comprise a pin or gudgeon insertable in a quick attachment structure or in one of the components of the support element.

With particular reference to the non-limiting embodiment illustrated in FIGS. 17 to 24, the locking/unlocking means 31 comprise a base plate 31a from which a pin 31b is extended that can be coupled in a seat 7f formed in the key component 7 and intended to move a sheet portion 7g, e.g. elastic, if desired curved, of the key component 7 from a locking position to an unlocking position. The sheet portion 7g can be extended from the substantially cylindrical wall 7d and has tip or end slidably mounted in a window obtained therein. In substance, once the locking/unlocking means 31 is installed or connected, it presses or moves the sheet portion 7g so as to bring the free tip or end thereof from an intermediate area between the stop teeth 17 or in any case engaged against the walls of the opening 8, towards and into a respective window formed in the substantially cylindrical wall 7d, such that it is possible to rotate the key component 7 from the work position to the rest position. If the locking/unlocking means is instead removed, then the sheet 7g snaps into stop position and the respective tip is inserted between the stop teeth 17 or in any case is abutted against and engages the walls of the opening 8; in such position, the key component 7 cannot rotate from the work position to the rest position, and thus it is not possible to release the base component 2 and the padding component 3. Naturally, the base component 2 and the padding component 3 can be fixed or connected to each other even if the locking/unlocking means are not connected or inserted.

The locking means 31 can also comprise a grip portion 31c extended from a face of the 5 base plate 31a opposite that from which the pin or gudgeon 31b is extended.

For the assembly of a support element 1, e.g. a saddle, according to the present invention, the upper surface 2a of the base component 2 and the lower surface 3b of the padding component 3 are aligned in abutment or in contact, e.g. substantially parallel, and then the removable anchoring means are actuated so as to removably anchor the base component 2 and the padding component 3. The removable anchoring preferably occurs manually.

If one or more accessories 5 or 50 are provided, these can be fixed as stated above by means of engagement means acting or operating between the base component 2 and the padding component 3. In such case, before the abutment or contact alignment of the base component 2 and the padding component 3, if provided, the at least one plate 4d is fixed, if desired by means of screwing, to the base component 2 or to the padding component 3, for example by means of bolts or screws 4b or with another means.

With reference then to the removable anchoring means, if the mobile component 7 is provided, once the base component 2 and the padding component 3 are brought into contact or associated operative position, the mobile component 7 is driven, for example by rotating it and for example by manually acting on the gripping portion 7a, around the axis x-x. Alternatively, the key component 7 could be longitudinally inserted in the opening 8 along the axis x-x.

In addition, the key component 7 can be mounted in the anchoring opening 8 before the abutment of the base component 2 and the padding component 3. For such purpose, the key component 7 could be inserted into the opening 8 starting from the outer side of the base component 2 or padding component 3, if desired starting from the lower surface 2b of the base component 2 or starting from the upper surface 3a of the padding component 3, before then projecting or being engageable by the other surface, i.e. by the upper 30 surface 2a of the base component 2 or lower surface 3b of the padding component 3.

During such steps, if the key component 7 and the anchoring opening 8 are obtained as indicated above, first the key component 7 is inserted into the opening 8 with projection(s) 13 angularly offset relative to the respective cradle portion 14. At this point, once the base component 2 and the padding component 3 have been assembled, by abutting the respective surfaces 2a and 3b, the operator or user for removably anchoring such components 2, 3 externally acts on the mobile component 7, for example on the gripping portion 7a, controlling the rotation of the mobile component 7, the engagement between the first 9 and the second constraining means 10 and the angular displacement of the projection(s) 13 until a respective cradle portion 14 is reached and insertion therein.

In addition, before such steps, if one or more tongues 21 are provided in a base component 2 or padding component 3—such tongues 21 being for the slidable engagement with a seat 22 formed in the other component, base 2 or padding 3—each tongue 21 is first inserted in a respective seat 22 and then the remaining part (for example the rear R) of the upper surface 2a of the base component 2 is abutted against the lower surface 3b of the padding component 3.

A support element according to the present invention can then comprise a base component 2 which has structure and configuration such as to be able to be used in combination with, and constrained to, a plurality of padding components 3 that are different from each other, in particular having different size and/or form and/or rigidity, see in particular FIGS. 25 to 27.

Due to such expedient, for example, a standard base component 2 can be provided on which all or many types of padding are constrainable, such that it is possible to obtain any type of support element, in particular a saddle, i.e. with all types of padding desired, starting from a same base component 2.

Such base component 2 can comprise all the components, portions and characteristics described above, or only some of these.

According to the present invention, a kit is then proposed for obtaining a support element as indicated above; such kit comprises at least one base component 2 as well as two or more padding components 3 having shape or size different from each other, each padding component being provided with means for the removable anchoring to the base component 2.

For such purpose, the padding component 3 can project laterally and/or on the rear and/or on the front with respect to the base component 2; advantageously, the surface, lower during use, 3b of the padding component 3 is larger than and extends beyond the surface, upper during use, 2a of the base component 2. In such case, the engagement means will be advantageously obtained at a central or intermediate area of the padding component 3, such that it is possible to removably anchor base component 2 and padding component 3, with padding component 3 that has greater width or is in any case projecting with respect to the base component.

According to the embodiment illustrated in the FIGS. 25-27, the surface, lower during use, 3b of the padding component 3 is larger than the surface, upper during use, 2a of the base component 2, and hence is extended beyond the surface, upper during use, 2a of the base component 2 at sections 3/1, 3/2 on the sides and/or at sections 3g on the rear and/or at sections on the front of the padding component 3. The lower surface 3b of the padding component 3 can, if desired, be C-shaped in cross section, in particular at the section or sections 3/1, 3/2, 3g or at the section on the front thereof projecting, during use, with respect to base component 2, so as to render it self-supporting or self-bearing.

In addition, as previously indicated, the padding component 3 can comprise a rigid material base or first rigid support layer 24a, lower during use and delimiting the lower surface 3b of the padding component 3, as well as a second soft layer 24b, if desired made of foam, connected to the first layer 24a and intended to delimit, at the free face thereof, the upper surface 3a of the padding component 3 which, during use, is in contact with the user. The second soft layer 24b can, for example, be molded, if desired via injection or casting, or glued on top of the first rigid layer 24a or vice versa.

The first rigid layer 24a can be made of a material selected from the group constituted by thermoplastic polymers and thermosetting polymers, while the second soft layer 24b can be made of a material selected from the group constituted by thermoplastic rubbers, expanded polyurethanes and gel.

The first rigid support layer 24a, in one version of the invention, can comprise a plurality of ribs 25, which serve to strengthen or stiffen the support element 2, in particular at the sections 3/1, 3/2 and 3g of the padding component 3.

The base component 2 can then be configured so to be at least partly, and preferably complementary, fit housable or positionable in a recessed portion or impression 27, if desired inwardly tapered, delimited in the padding component 3.

In addition, at the recessed portion or impression 27 and the base component 2 housed therein, if desired on one or more of its side walls, connection means can be formed, if desired sliding, for connecting the base 2 and padding 3 components. The connection means can comprise one or more bosses or protrusions 28, for example with partially conical or frustoconical configuration which extend from the edge or side wall of the base component 2 or the padding component 3, as well as one or more grooves formed in the other component, padding 3 or base 2 or better yet in the recessed portion 27 formed therein, with each of which the protrusion(s) 28 are intended to be fit coupled. Such connection means act both as reference and for the security of the support or contact between the padding component 3 and the support component 2.

In a still further version of the invention, the base component 2 comprises two or more elements slidably engaged with each other, such that they can move away or move close, thus increasing or decreasing the width of the base component 2. The elements of the base component 2, slidably engaged with each other, can be slidable in one plane, horizontal during use, so as to cause the widening/ narrowing of the support and/or vertical element, thereby causing the thickening or non-thickening of the support element. Due to such expedient it is possible, among other things, to adapt the base component 2 to support padding components 3 of different size and/or shape and/or rigidity.

In one version of the invention, a support element according to the present invention can include, between the base component 2 and the padding component 3, at least one intermediate layer, if desired made of rubber or a similar material.

Such at least one intermediate layer is intended to be at least partially extended around the facing free edge of the base component 2 and/or of the padding component 3, so as to enclose or conceal the space or gap between the edge of the upper surface 2a of the base component 2 and that of the lower surface 3b of the padding component 3, as well as to damp the vibrations and reduce the noise deriving from the relative displacement of such components 2, 3. As will be understood, in fact, the base component 2 and the padding component 3 are usually made of plastic or a similar material and the relative displacement thereof, for example during pedaling, if the support element is a bicycle saddle, could give rise to squeaking. The above-described at least one intermediate layer would therefore ensure advantages from an aesthetic as well as functional standpoint. In one version of the invention, the at least one intermediate layer covers the entire surface of the recessed portion or impression 27 of the padding component 3, possibly also comprising the tapered edges thereof.

In a further version, also the base component 2 and/or its surface, upper or inner during use, can be covered by the at least one intermediate layer.

The tip or tips of the fork RA could then also be fixed between the base component 2 and a plate 29 (or a similar element), the latter being fixed to the base component by means of screws 30. Such solution allows preventing deformations of the components of the support element following the insertion of the fork RA.

As will be understood, a support element according to the present invention allows quickly, easily and stably constraining an interchangeable padding element, possibly equipped with one or more accessories.

In addition, a support element according to the present invention allows removably anchoring the base component and the padding component, being able to constrain and release them by means of manual operations, without tools being required, for example screwdrivers, and also in a quick manner, still ensuring a reliable anchoring.

Among other things, this allows a user to easily release and bring the padding component with him/her, without the base component, each time he/she wishes. Such advantage is particularly useful when the support element is a saddle: in such case, the user (cyclist) can detach the padding from the base, and hence from the bicycle, each time he/she parks his bicycle, so as to limit as much as possible bicycle or saddle thefts. Then, if in particular a support element according to the present invention comprises one or two standard base components for a plurality of paddings, the user can—once the base component(s) 2 has/have been purchased—decide to use the padding component 3 that he/she wishes, hence with the preferred size, height and configuration. In addition, the various padding components 3 can be of any type, i.e. they can have inserts or portions made of gel or other material, can be made of integral polyurethane or polyurethane covered by hand or made by means of vacuum technology, or have size for man or woman, etc.

This ensures clear advantages, including ecological benefits, considering that the padding component is the component most subject to wear and once the same has been definitively ruined and is no longer usable, the user can eliminate it and replace it with a new one, maintaining though the same base component, hence limiting the elements to be eliminated/disposed of. In addition, as will be understood, due to the provision of removable anchoring means, the padding component can be disposed of in a simpler and less expensive manner than prior art solutions.

Another advantage deriving from the use of a base component according to the present invention consists of the fact that the user can obtain a support element meeting one's own aesthetic and functional desires, for example regarding comfort and shape of the padding.

In addition, production advantages are obtained since, with regard to the base component, it is possible to provide for a single production line, avoiding the need to have different production lines for the various saddle types, each equipped with a different base component or body.

In addition, starting from one or at most two base components 2, it is possible to make practically all saddle types, for example of racing type, of so-called "athletic" type, of touring type or in any case of the so-called "moderate relaxed" type.

Figure 28:
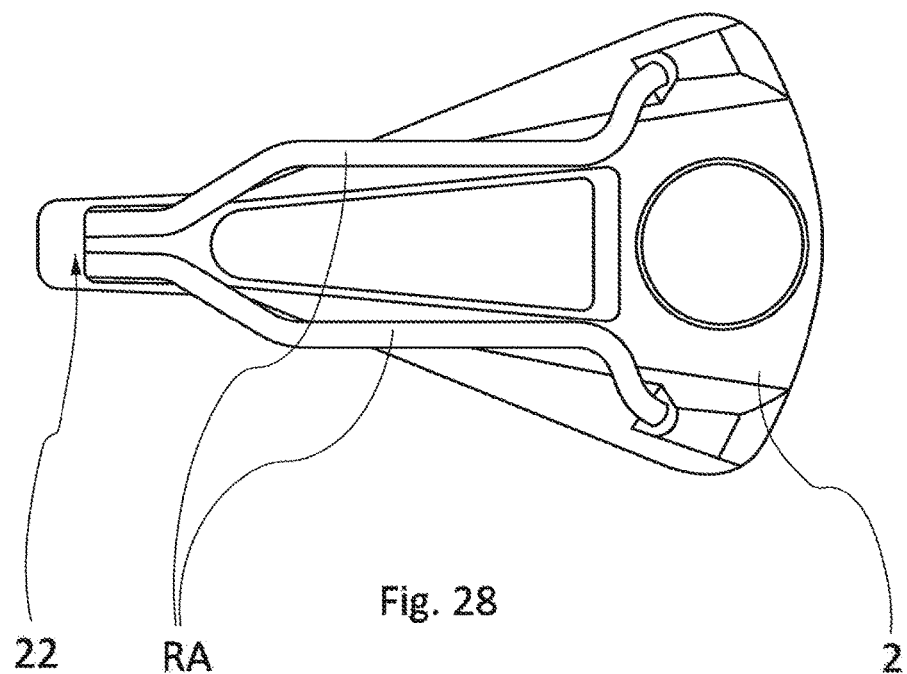
FIGS. 28 and 29 are bottom views of one version of a base component of the support element according to the present invention.
Figure 29:
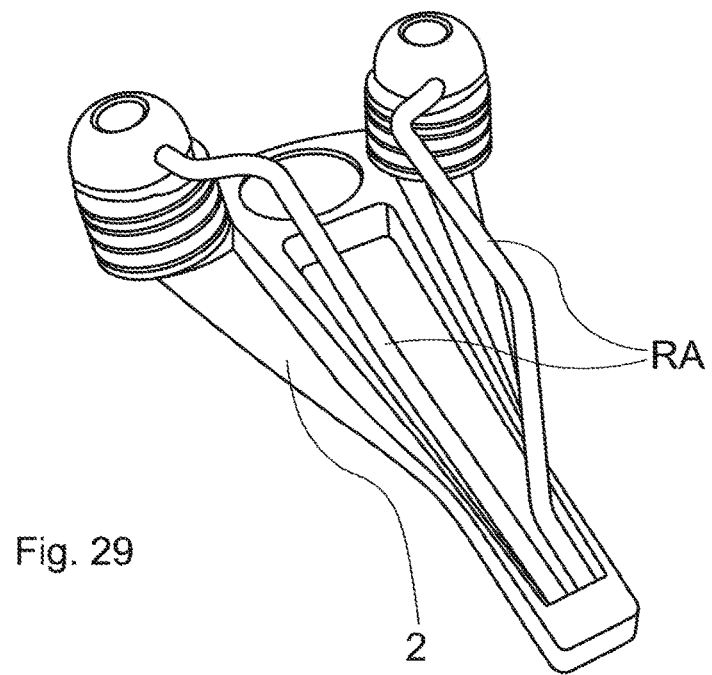
Figure 30:
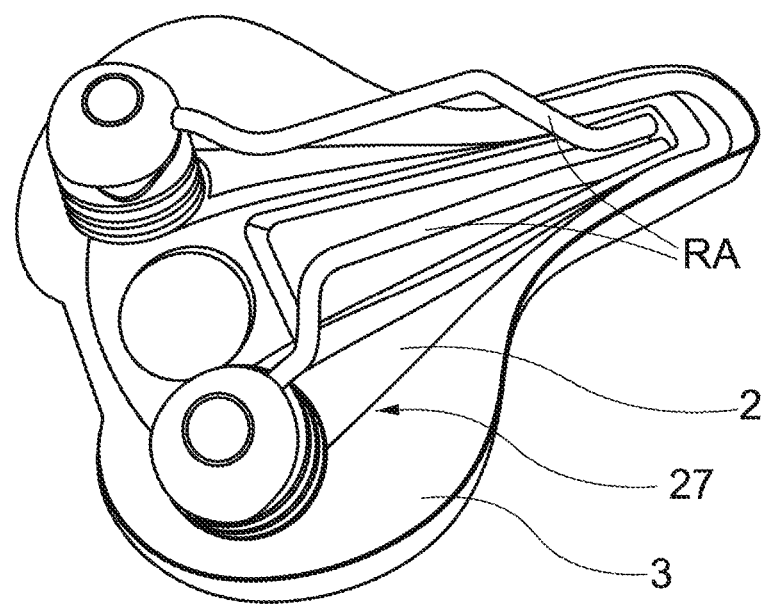
FIG. 30 is an assembled view of the support element according to the present invention comprising the base component of FIG. 29.
Figure 31:
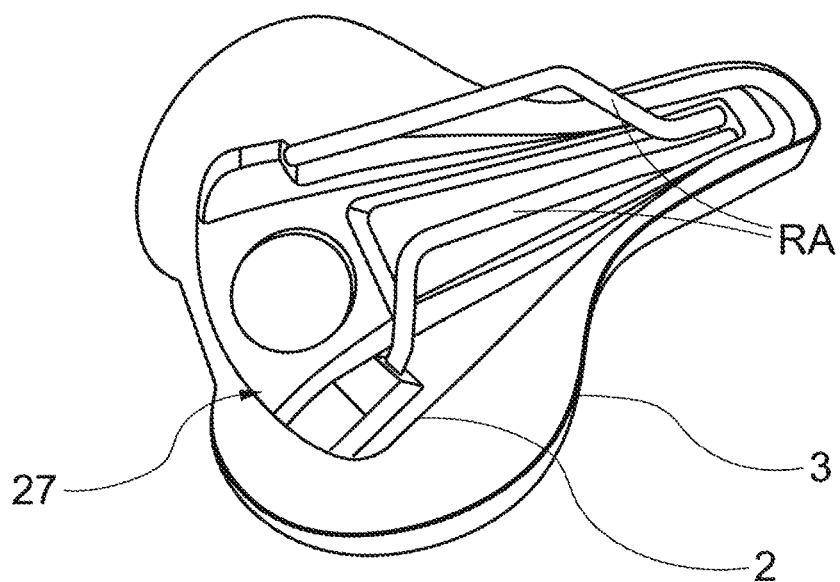
FIG. 31 is an assembled view of the support element according to the present invention comprising the base component of FIG. 28.
Figure 32:
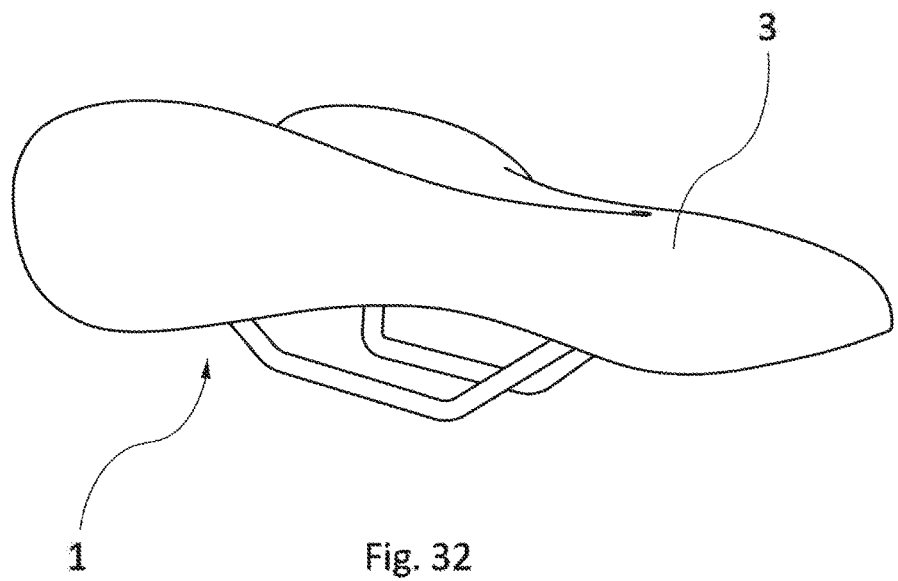
FIG. 32 is a configuration embodiment of the padding component of a support element according to the present invention.
Figure 33:
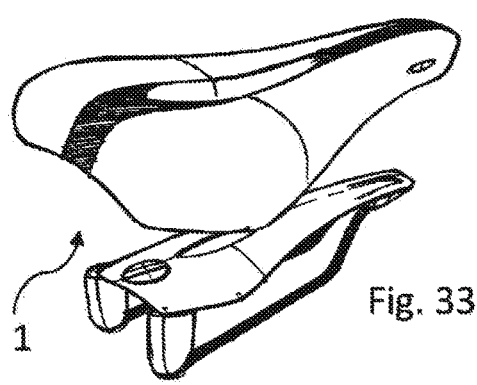
FIGS. 33 to 35 are exploded perspective views of various versions of the support element according to the present invention.
Figure 34:
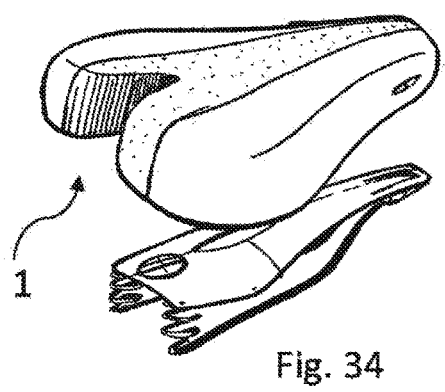
Figure 35:
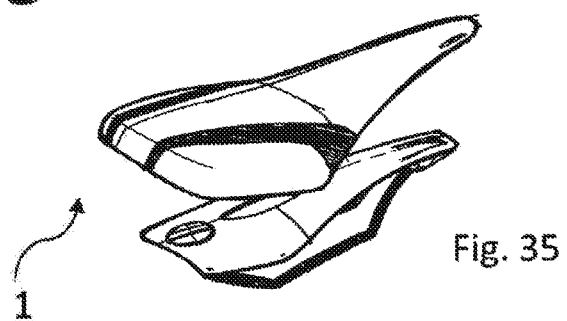

Preferably, as illustrated in FIGS. 28, 29, the two standard base component types could be as follows: one equipped with connection elements for a fork or rail and lacking shock-absorbing elements (e.g. FIG. 28) and the other suitable for fixing shock absorbers (e.g. FIG. 29), such as springs, for example cup-like or helical, elastomers or the like, if desired also interposed between a fork or rail and the respective base component.

Such base components can then be constrained to any type of padding, as is for example visible in FIGS. 30 to 35.

With reference to FIGS. 36 to 39, they relate to a base component 2 and to a padding component 3 for another support element according to the present invention, which is similar to those described above, but includes a tongue 21 protruding towards the rear R of the support element starting from the lower surface 3b of the padding component 3, whereas a seat 22 is formed in the upper surface 2a of the base component 2 or delimited by a wall section extending therefrom. Such solution ensures space saving of about 1 cm, so as to make it possible to realize support elements (for example saddles) with a thinner shape, thus obtaining an improvement of aesthetics and design.

Furthermore, between the tongue 21 or rather the tip thereof and the lower surface 3b of the padding component 3, a reinforcement plate 21a of the tongue 21 itself can be provided, in which case, a notch 22a is formed in the wall section delimiting the seat 22 and distal from the upper surface 2a of the base component 2, the reinforcement plate 21a being sliding mounted, in use, in the notch.

Moreover, a support element according to the present invention, see for example FIGS. 36 to 39, can include a base component 2 in which, and more particularly at an intermediate portion thereof, a longitudinal through groove 23 is formed. Furthermore, the padding component 3 can comprise a projecting or raised portion 23a, for example substantially annular, which protrudes from an intermediate portion of the lower surface 3b and intended to be, in use, fit inserted within the longitudinal through groove 23 or abutted against the section of the upper surface 2a delimiting the same, so as to improve the engagement between the base component 2 and the padding component 3 as well as the support of the padding component 3.

Modifications and variations of the invention are possible within the protective scope defined by the claims.

The invention claimed is:

1. A support element for the human body, including a saddle for a vehicle, a bicycle or a motorcycle or a sport equipment, comprising at least a padding component and a base component or body, said base component comprising a surface, upper during use, and a surface, lower during use, said padding component comprising a surface, upper during use, and a surface, lower during use, intended to engage said surface, upper during use, of said base component, further comprising a removable anchoring means for removably anchoring said base component to said padding component, and in that said padding component comprises at least a first rigid support layer, lower during use, wherein said surface, lower during use, or said first rigid support layer of said padding component is larger and extends beyond the surface, upper during use, of said base component, so that said padding component projects at least one of laterally, or on the rear and on the front with respect to at least one of the base component, and said removable anchoring means are obtained at a substantially central or intermediate area of said padding component, so that it is possible to removably anchor said padding component to said base component which has a width lower than said padding component, wherein said removable anchoring means comprise:
a mobile or key component mountable in an anchoring opening obtained in said base component or in said padding component, said mobile component having first constraining means that extend in the area between said base component and said padding component, and
second constraining means in the other between said padding component and said base component intended to engage with said first constraining means, when said key component is inserted in said anchoring opening and said base component is taken into engagement with said padding component, wherein said mobile component is at least one of rotatably mounted in said anchoring opening around an axis of symmetry (x-x) of said anchoring opening or wherein said removable anchoring means comprise bayonet anchoring means or said removable anchoring means comprise a quick attachment structure or wherein said key component comprises said quick attachment structure.

2. The support element according to claim 1, wherein said base component has a structure and a configuration to be able to be used in combination with and constrained to a plurality of padding components different from each other in at least one of shape, size and rigidity, or to a plurality of parts of said padding component, different from each other in at least one of size, shape or rigidity, so that it is possible to obtain different types of support elements starting from the same base component.

3. The support element according to claim 1, wherein said padding component comprises a second soft layer designed to be in contact with the user and connected to said first rigid support layer.

4. The support element according to claim 1, wherein said base component is configured to be at least in part fit housable or positionable in a recessed portion, delimited by said padding component or placed in said first rigid support layer.

5. The support element according to claim 4, wherein at said recessed portion and said base component therein housed, connection means of said base component and padding component are provided.

6. The support element according to claim 5, wherein said connection means comprise at least one boss or protrusion extending from the edge or side wall of said base component or said padding component, as well as at least one groove formed in the other of said padding component or said base component, said at least one boss or protrusion being intended to be fit inserted with a corresponding said at least one groove.

7. The support element according to claim 1, comprising at least an intermediate layer placed between said base component and said padding component, said intermediate layer at least partially extending around the facing free edge of at least one of said base component and said padding component, to enclose or conceal the space or gap between the edge of the upper surface of said base component and the edge of said lower surface of said padding component.

8. The support element according to claim 1, comprising engagement means for engaging at least one accessory to said base component or to said padding component, said engagement means being intended to act in the area between said upper surface of said base component and said lower surface of said padding component.

9. The support element according to claim 1, wherein said removable anchoring means includes a gripping portion extending outside of the area between said base component and said padding component, said gripping portion being engageable from outside the area between said base component and said padding component, thereby allowing a manual displacement of said removable anchoring means between at least one rest position, wherein said base component and said padding component are released or releasable and at least one work position, wherein said base component and said padding component are firmly anchored to one another.

10. The support element according to claim 1, wherein said first constraining means comprises a tang from which a plurality of tabs extends, circumferentially spaced from each other, and said second constraining means include a sleeve element, from which respective teeth or protuberances extend, or grooves are formed, intended to engage with said tabs.

11. The support element according to claim 1, comprising at least one tongue projecting towards the front (F) or the rear (R) of said support element from the lower surface of said padding component or from the upper surface of said base component, said tongue being engageable with a seat formed in the other between the upper surface of said base component and the lower surface of said padding component by relative sliding between the base component and the padding component or comprising means for locking/unlocking said removable anchoring means.

12. The support element according to claim 1, wherein said support element is a bicycle saddle and comprises a fork component or rail (RA), usually comprising a U-shaped component formed by a pair of bars or tines connected at an end or an annular component, wherein said fork component or rail (RA) is, during use, interposed between said base component and the seat post of a bicycle frame or wherein said base component is a rigid body lacking the fork for the connection to the seat post, suitable to be directly connected during use to the seat post of a bicycle frame, or wherein said base component is a body with combined seat post or wherein said base component is equipped with connection elements for a fork component or rail (RA), possibly comprising shock-absorbing fixing elements.

13. The support element according to claim 1, wherein said base component has a substantially triangular configuration, with a front portion placed at the front portion (F) of the support element, lengthened or tapered, and a rear portion, placed at the rear portion (R) of the support element, of enlarged configuration.

14. A support element for the human body, including a saddle for a vehicle, a bicycle or a motorcycle or a sport equipment, comprising at least a padding component and a base component or body, said base component comprising a surface, upper during use, and a surface, lower during use, said padding component comprising a surface, upper during use, and a surface, lower during use, intended to engage said surface, upper during use, of said base component, further comprising a removable anchoring means for removably anchoring said base component to said padding component, and in that said padding component comprises at least a first rigid support layer, lower during use,
  wherein said surface, lower during use, or said first rigid support layer of said padding component is larger and extends beyond the surface, upper during use, of said base component, so that said padding component projects at least one of laterally, or on the rear and on the front with respect to at least one of the base component, and said removable anchoring means are obtained at a substantially central or intermediate area of said padding component, so that it is possible to removably anchor said padding component to said base component which has a width lower than said padding component,
  wherein said removable anchoring means comprise:
    a mobile or key component mountable in an anchoring opening obtained in said base component or in said padding component, said mobile component having first constraining means that extend in the area between said base component and said padding component, and
    second constraining means in the other between said padding component and said base component intended to engage with said first constraining means, when said key component is inserted in said anchoring opening and said base component is taken into engagement with said padding component,
  wherein said key component comprises a main plate, starting from a surface, inner during use, from which said first constraining means project upwards, whereas from its other surface, outer during use, a gripping portion projects, said gripping portion comprising a bridge element delimiting a through opening intended to be the female part of a quick attachment structure, or wherein said main plate of said key component is anchorable in position in said anchoring opening by connection means.

15. A kit for the obtainment of a support element comprising at least a padding component and a base component, said base component comprising a surface, upper during use, and a surface, lower during use, said padding component comprising a surface, upper during use, and a surface, lower during use, intended to engage said surface, upper during use, of said base component, further comprising a removable anchoring means for removably anchoring said base component to said padding component, and in that said padding component comprise at least a first rigid support layer, lower during use, wherein the padding component comprises at least two padding components having at least one of a shape, size and rigidity different from each other, or parts of at least two padding components having at least one of a shape, size, and rigidity different from each other, each padding component or part of the padding component being provided with removable anchoring means for removably anchoring to said base component,
  wherein said surface, lower during use, or said first rigid support layer of said padding component is larger and extends beyond the surface, upper during use, of said base component, so that said padding component projects at least one of laterally, or on the rear and on the front with respect to at least one of the base component, and said removable anchoring means are obtained at a substantially central or intermediate area of said padding component, so that it is possible to removably anchor said padding component to said base component which has a width lower than said padding component,
  wherein said removable anchoring means comprise:
    a mobile or key component mountable in an anchoring opening obtained in said base component or in said padding component, said mobile component having first constraining means that extend in the area between said base component and said padding component, and
    second constraining means in the other between said padding component and said base component intended to engage with said first constraining means, when said key component is inserted in said anchoring opening and said base component is taken into engagement with said padding component,
  wherein said mobile component is at least one of rotatably mounted in said anchoring opening around an axis of symmetry (x-x) of said anchoring opening or wherein said removable anchoring means comprise bayonet anchoring means or said removable anchoring means comprise a quick attachment structure or wherein said key component comprises said quick attachment structure.

16. A support element for the human body, including a saddle for a vehicle, a bicycle or a motorcycle or a sport equipment, comprising at least a padding component and a base component, said base component comprising a surface, upper during use, and a surface, lower during use, said padding component comprising a surface, upper during use, and a surface, lower during use, intended to engage said surface, upper during use, of said base component, further comprising a removable anchoring means for removably anchoring said base component to said padding component, and in that said padding component comprises at least a first rigid support layer, lower during use,
  wherein said removable anchoring means comprises:
    a mobile or key component mountable in an anchoring opening obtained in said base component or in said padding component, said mobile component having first constraining means that extend in the area between said base component and said padding component, and
    second constraining means in the other between said padding component and said base component intended to engage with said first constraining means, when said key component is inserted in said anchoring opening and said base component is taken into engagement with said padding component, and
  wherein said removable anchoring means includes a gripping portion extending outside of the area between said base component and said padding component, said gripping portion being engageable from outside the area between said base component and said padding component, thereby allowing a manual displacement of said removable anchoring means between at least one rest position, wherein said base component and said padding component are released or releasable and at least one work position, wherein said base component and said padding component are firmly anchored to one another.

\* \* \* \* \*